(12) United States Patent
Ahluwalia

(10) Patent No.: US 8,423,036 B2
(45) Date of Patent: Apr. 16, 2013

(54) DRX CONFIGURATION

(75) Inventor: Jagdeep Singh Ahluwalia, Sutton (GB)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 12/452,788

(22) PCT Filed: Jul. 23, 2008

(86) PCT No.: PCT/JP2008/063613
§ 371 (c)(1),
(2), (4) Date: Jan. 22, 2010

(87) PCT Pub. No.: WO2009/014248
PCT Pub. Date: Jan. 29, 2009

(65) Prior Publication Data
US 2010/0130214 A1 May 27, 2010

(30) Foreign Application Priority Data

Jul. 24, 2007 (GB) .................................. 0714448.8

(51) Int. Cl.
*G06F 15/16* (2006.01)
(52) U.S. Cl.
USPC .......................................... 455/450; 370/329
(58) Field of Classification Search .................. 455/450, 455/509, 550.1, 557; 370/311, 328, 329, 370/336
See application file for complete search history.

(56) References Cited

U.S. PATENT DOCUMENTS

| 5,982,779 A | 11/1999 | Krishnakumar et al. |
| 6,347,120 B1 | 2/2002 | Sakoda |
| 2005/0036466 A1 | 2/2005 | Malik et al. |
| 2005/0111462 A1* | 5/2005 | Walton et al. ............. 370/395.4 |
| 2007/0147327 A1 | 6/2007 | Jin et al. |
| 2010/0135159 A1* | 6/2010 | Chun et al. .................... 370/241 |

FOREIGN PATENT DOCUMENTS

| CN | 1906900 A | 1/2007 |
| JP | 2007-511158 A | 4/2007 |
| JP | 2007-512783 A | 5/2007 |
| WO | WO 2007/024095 A2 | 3/2007 |
| WO | WO 2007/024095 A3 | 3/2007 |
| WO | WO 2008/133564 A1 | 11/2008 |

OTHER PUBLICATIONS

"Universal Mobile Telecommunications System (UMTS); Evolved Universal Terrestrial Radio Access (E-UTRA) and Evolved Universal Terrestrial Radio Access(E-UTRAN); Overall description; Stage 2 (3GPP TS 36.300 version 8.1.0 release 8); ETSI TS 136 300", ETSI Standards, LIS, Sophia Antipolis Cedex, France, vol. 3-R2, No. V8.1. 0, Jun. 1, 2007, XP014038500 ISSN: 0000-0001.

(Continued)

*Primary Examiner* — Sam Bhattacharya

(74) *Attorney, Agent, or Firm* — McGinn IP Law Group, PLLC

(57) ABSTRACT

A system is proposed to provide DRX/DTX configuration for mixed real time and non-real time transmission scenarios in a mobile telecommunications environment, particularly applicable to 3GPP networks. The proposed DRX/DTX configuration involves maintaining the DRX/DTX interval the same between the switching of real time VoIP data from an active period to a silence period. The proposed DRX/DTX configuration schedules transmission and/or reception times for a mobile device so that packets for non-real time services are transmitted/received immediately after packets for real time services.

31 Claims, 10 Drawing Sheets

OTHER PUBLICATIONS

Nokia:"Active mode DRX details" 3GPP Draft;R2-070243 Active Mode DRX Details, 3rd Generation Partnership Project (3GPP), Mobile Competence Centre; 650, Route Des Des Lucioles; F-06921 Sophia-Antipolis Cedex; France,vol. tsg_ran/WG2_RL2/TSGR2_56bis/Documents, No. Sorrento, Italy; 20070115, Jan. 10, 2007, XP030133339, the whole document.

"Summary of email discussion on DRX control", Internet Citation, [Online] vol. R2-071553, Mar. 26, 2007, pp. 1-33, XP003023548, Retrieved from the Internet: URL: http://www.3gpp.org/ftp/tsg_ran/WG2-RL2/TSGR2-57bis/Documents/R2-071553.zip> [retrieved on Jan. 1, 2008] pp. 3-5.

"Views on DRX/DTX control in LTE (Doc. No. R2-063397)", Internet Citation, [Online] Nov. 6, 2006, XP007905621, Retrieved from the Internet: URL:ftp://ftp.3gpp.org/tsg_ran/WG2_RL2/TSGR2-56/Documents/R2-063397.zip> [retrieved on Sep. 9, 2008], Figure 1.

Nokia: "DRX parameters in LTE", 3rd Generation Partnership Project (3GPP); Technical Specification Group (TSG) Radio Access Network (RAN); Working Group 2 (WG2) #45, Shanghai, China, XX, XX, vol. R2-071285, Mar. 26, 2007, pp. 1-7, XP003023549, the whole document.

Nokia:"On the need for flexible DRX"3GPP Draft; R2-071286 on the Need for Flexible DRX, 3rd Generation Partnership Project(3GPP), Mobile Competence Centre; 650, Route Des Lucioles; F-06921 Sophia-Antipolis Cedex; France, vol. tsg_ran/WG2-RL2/TSGR2-57bis/Documents, No. St. Julian;20070326, Mar. 20, 2007, XP050134242, the whole document.

NEC: "DRX for Mixed Traffic Scenarios", 3GPP TSG-RAN2 Meeting #59, R2-073348, Aug. 24, 2007 pp. 1-4, XP002507131, Athens, Greece the whole document.

Chinese Office Action dated Jun. 5, 2012, with English-language translation.

Japanese Office Action dated Apr. 25, 2012, with partial English translation.

Japanese Office Action dated Aug. 1, 2012, with partial English-language translation.

3GPP TS 36.300 version 8.1.0 Release 8, Jun. 2007.

* cited by examiner

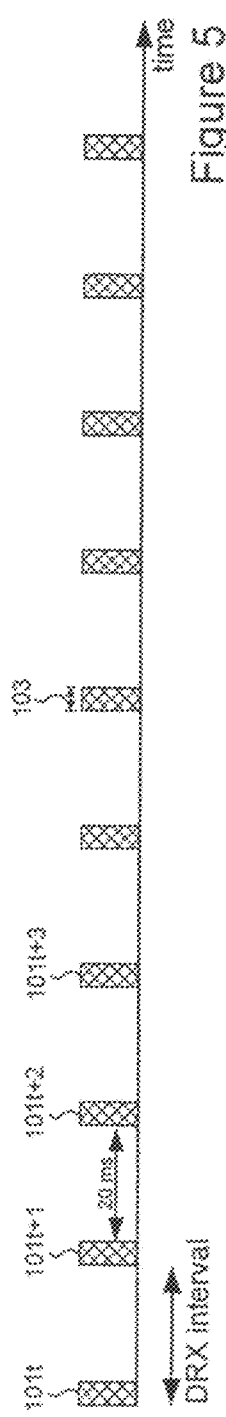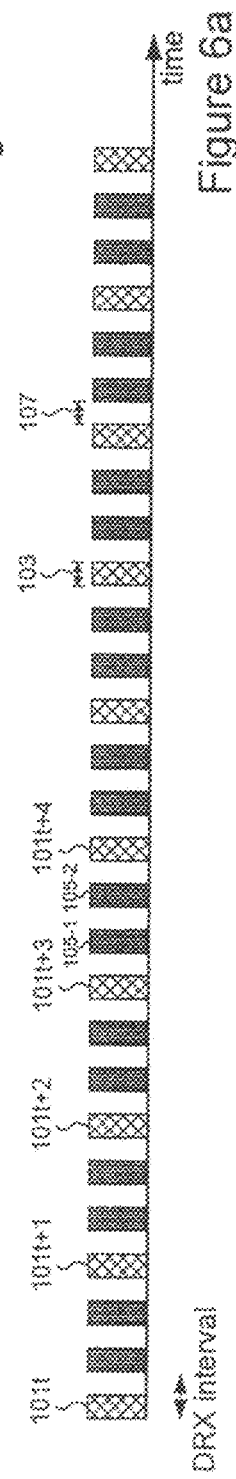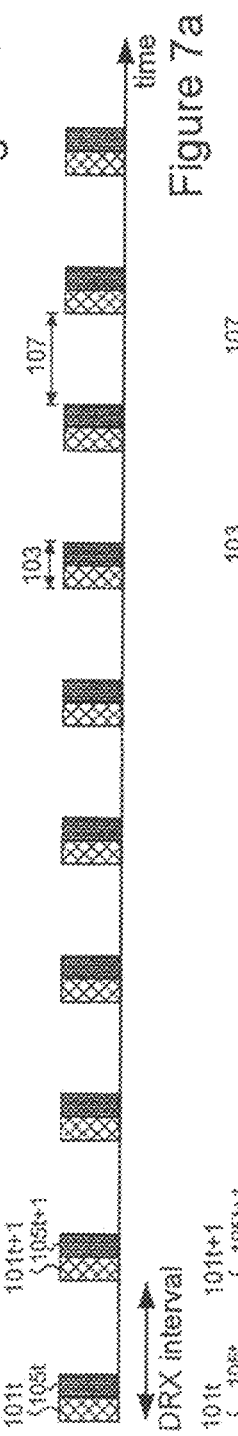

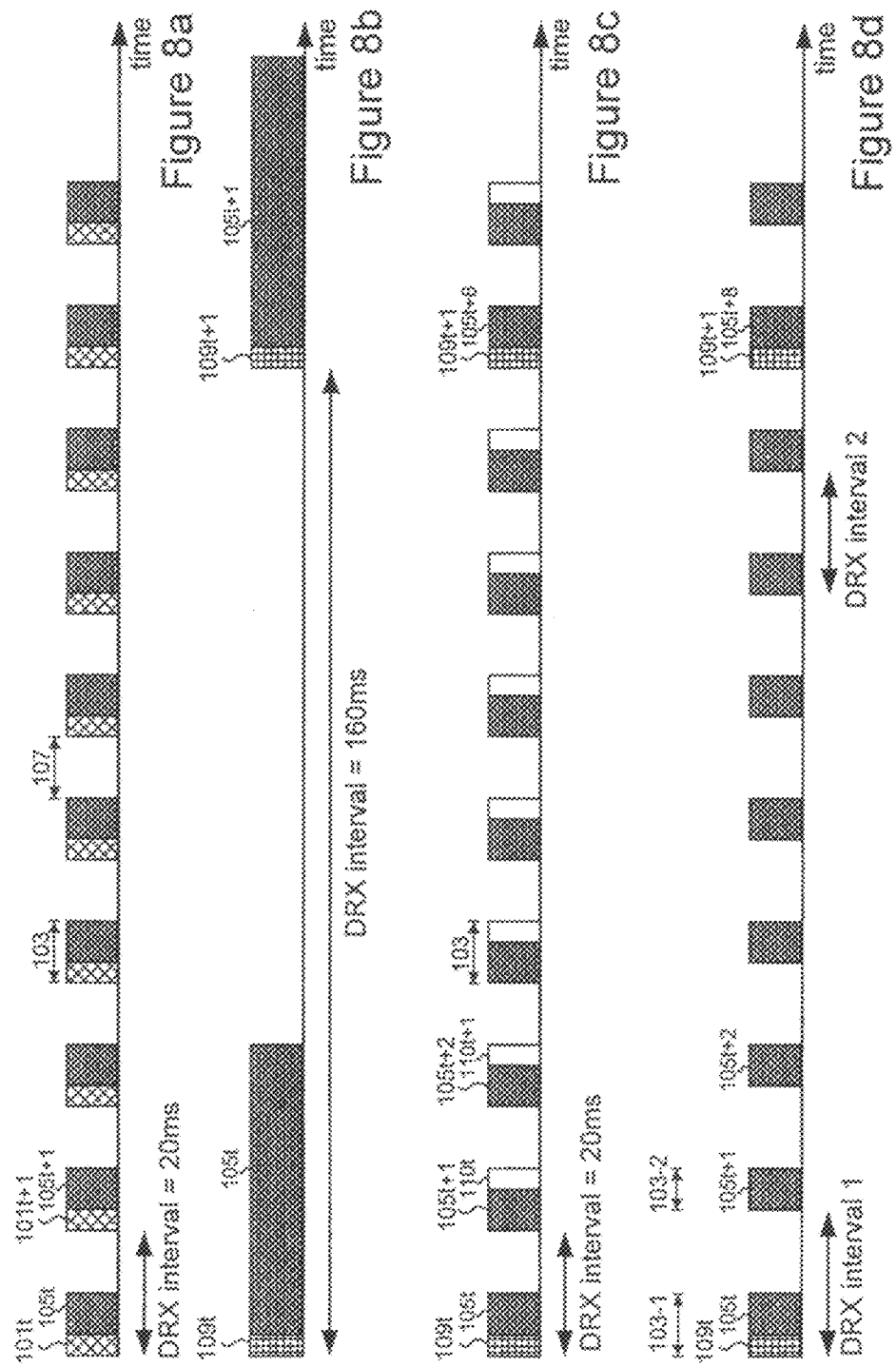

DRX CONFIGURATION

TECHNICAL FIELD

The present invention relates to mobile telecommunication networks, particularly but not exclusively networks operating according to the 3GPP standards or equivalents or derivatives thereof.

BACKGROUND ART

In mobile telecommunication networks, when User Equipment (UE) is connected to the network (RRC_CONNECTED state) it can be configured to receive and/or transmit data in discontinuous time periods, the duration and frequency of which are controlled by the base station (eNodeB). This discontinuous reception/transmission is called DRX/DTX and allows the UE to turn off its transceiver circuitry during the periods when it is not supposed to receive and/or transmit data from the base station, thereby reducing power consumption. Additionally, during periods that the UE is not scheduled to receive data, it is also required to perform some signal strength measurements to assist the network in making inter frequency handovers (for example between cells operating at different frequencies) or inter network (RAT) handovers (for example from UMTS to GSM). There is therefore a requirement to configure the UE with a DRX/DTX schedule or pattern so that the UE has maximum power saving and sufficient gaps made available for the UE to make the above measurements.

During RAN2#58, some agreements were made on DRX handling for non real time (NRT) services, such as web browsing, FTP etc. The NRT DRX handling that was agreed involves the provision of periodic fixed duration reception windows in which the UE can receive data from the base station. During the on duration, the UE is intended to monitor the L1/L2 control channel for possible resource allocations. During the off duration, the UE is not required to monitor the L1/L2 control channel, it can turn off its receiver circuit, and can perform inter-frequency/inter RAT measurements, if needed. However, the agreements do not consider the handling of real time (RT) services such as VoIP and mixed traffic (NRT and RT) scenarios.

DISCLOSURE OF THE INVENTION

The present invention is adapted to provide a number of options for DRX/DTX scheduling for RT and mixed service scenarios.

According to one aspect, the present invention provides a method performed by a mobile communication device of a communication network, the method comprising: receiving allocation data defining an allocation of resources for both a real time service and a non real time service; storing a DRX/DTX pattern which comprises: i) duration data defining a duration of on periods in Which the mobile device can communicate data with the communication network; and ii) interval data defining an interval between adjacent on periods; using the DRX/DTX pattern to control times at which the mobile communication device can power down circuitry thereof; and using said DRX/DTX pattern and the allocated resources to control the communication of data with the communication network, such that: i) non real time data and real time data are communicated in different on periods; or ii) non real time data is communicated in the same on period as real time data.

The DRX/DTX pattern may be just a DRX pattern or it may be just a DTX pattern or it may be a pattern that is common to both DRX and DTX.

In one embodiment, the starting time for each on period is fixed while the duration of each on period is configured as a function of the traffic activity level.

In one embodiment, the DRX/DTX pattern and the allocated resources are such that non real time data is communicated in the same on period as real time data and preferably immediately after the real time data. In another embodiment, the allocated resources are used to control the communication of data with the communication network, such that each on period includes non real time data and real time data.

The DRX/DTX pattern may be changed by the network, for example to take into account changing amounts of non-real time traffic. This may be achieved by changing the duration of the on periods and/or changing the interval between the on periods.

Preferably the resource data defines periodic communication opportunities for the real time data. Where the real time data service includes an active period and a silence period, the frequency of the periodic communication opportunities for the active period is greater than that for the silence period. In a preferred embodiment the DRX/DTX pattern is independent of whether the real time data service is in the active mode or the silence mode, although it may be varied depending upon the amount of non real time data to be communicated.

In between the on periods, the mobile communication device preferably makes one or more signal measurements of signals from the communications network. These can be for controlling inter frequency or inter RAT handovers.

The interval data may define the interval between the start of adjacent on periods or the gap between adjacent on periods.

The present invention also provides a method performed by a node of a communication network, the method comprising: storing a DRX/DTX pattern for a mobile communication device, which DRX/DTX pattern comprises: i) duration data defining a duration of on periods in which the mobile device can communicate data with the communication node; and ii) interval data defining an interval between adjacent on periods; generating allocation data for the mobile communication device in accordance with a requested real time service and a requested non real time service and in accordance with the stored DRX/DTX pattern; and sending the allocation data to the mobile communication device for use with the DRX/DTX pattern to control the communication of data between the mobile communication device and the communication node, such that: i) non real time data and real time data are communicated in different on periods, with the non-real time data being communicated within one or more on periods between two on periods in which real time data is communicated; or ii) non real time data is communicated in the same on period as real time data.

In one embodiment, the allocation data that is generated controls the communication of data with the mobile communication device, such that non real time data is communicated in the same on period as real time data and preferably after the real time data. Alternatively, the allocated resources may control the communication of data with the communication network, such that each on period includes non real time data and real time data.

Preferably, the method includes signalling to the mobile communication device a change in the duration of said on periods or of the interval between adjacent on periods of the DRX/DTX pattern, to accommodate a change in the amount of traffic to be communicated between the node and the mobile communication device.

In one embodiment the generating step generates resource data that defines periodic communication opportunities for real time data. Where the real time data service includes an active period and a silence period the generated resources are such that the frequency of the periodic communication opportunities for said real time data is greater during the active period than during the silence period. The DRX/DTX pattern for the mobile communication device is preferably independent of whether the real time data service is in the active mode or the silence mode.

In one preferred embodiment, the allocated resources are used to control the communication of data between the communication network and the mobile communication device, such that during the silence period, the mobile communication device does not communicate data with the communication network for at least one frame of the one or more of the on periods.

Although for efficiency of understanding for those of skill in the art the invention will be described in detail in the context of a 3G system, the principles of DRX/DTX scheduling can be applied to other systems, e.g. other CDMA or wireless in which a mobile device or User Equipment (UE) communicates with one of several other devices (corresponding to eNodeB) with the corresponding elements of the system changed as required.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

FIG. 5 illustrates a DRX/DTX pattern used in the mobile communication device during an active period of a real time VoIP service;

FIG. 6a illustrates a first DRX/DTX option for a mixed (real time and non-real time) service scenario during an active part of a real time VoIP service;

FIG. 6b illustrates a second DRX/DTX option for a mixed (real time and non-real time) service scenario;

FIGS. 7a and 7b illustrate the way in which the on durations for the DRX/DTX option shown in FIG. 6b varies depending on the amount of non-real time traffic;

FIG. 8a illustrates a DRX/DTX schedule for real time active VoIP service and non-real time service scheduled over one large period;

FIG. 8b illustrates a first alternative for a DRX/DTX schedule for real time VoIP service during a silent period and non-real time traffic over the same period as shown in FIG. 8a;

FIG. 8c illustrates a second alternative for a DRX/DTX schedule for real time VoIP service during a silent period and non-real time traffic over the same period as shown in FIG. 8a;

FIG. 8d illustrates a third alternative for a DRX/DTX schedule for real time VoIP service during a silent period and non-real time traffic over the same period as shown in FIG. 8a;

BEST MODE FOR CARRYING OUT THE INVENTION

Overview

Figure 1:
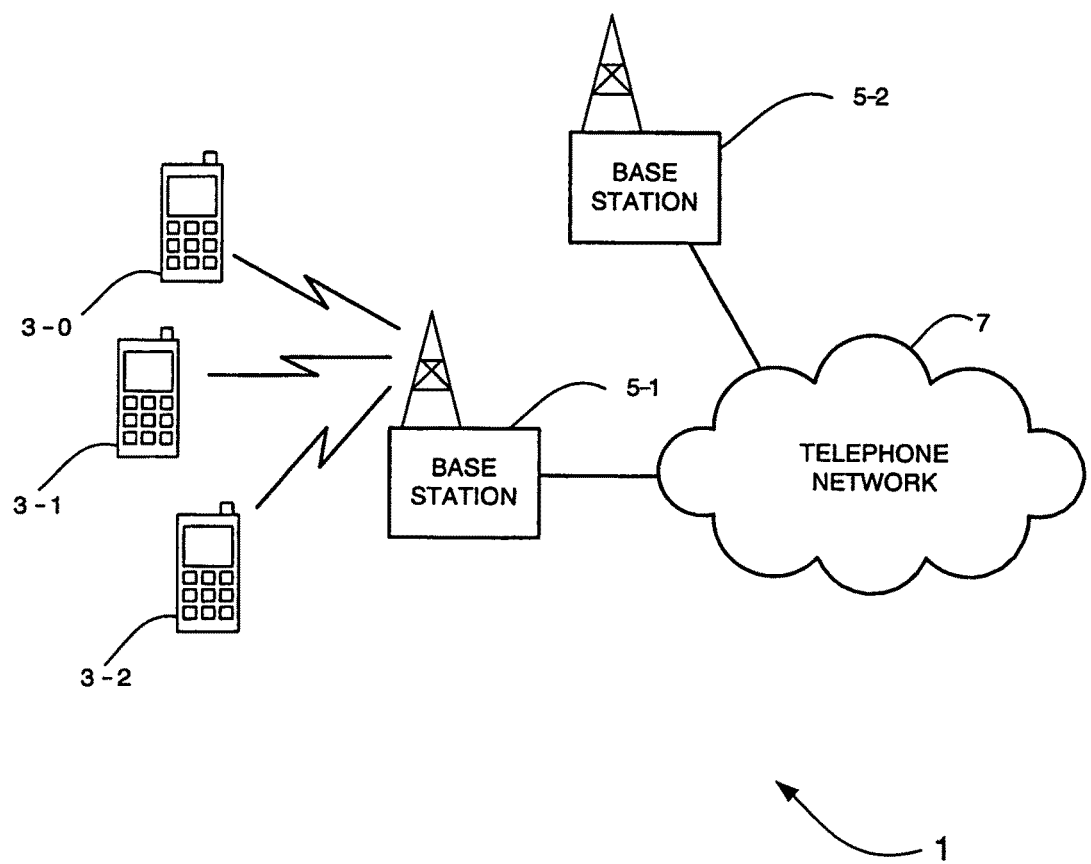
FIG. 1 schematically illustrates a mobile telecommunication system of a type to which the embodiment is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. A number of uplink and downlink communications resources (sub-carriers, time slots etc) are available for the wireless link between the mobile telephones 3 and the base stations 5. In this embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5.

To help the mobile telephones 3 conserve power, each mobile telephone 3 is configured in advance and/or by the base station 5 to receive and transmit its data only during predetermined periods defined by a DRX/DTX pattern. In between those periods, the mobile telephone 3 can power down its transceiver circuitry to conserve battery power. Different options are considered below for DRX/DTX patterns that will allow for both real time and non-real time services whilst also allowing gaps between "on durations" in which the mobile telephone 3 can make appropriate inter frequency/RAT measurements.

Base Station

Figure 2:
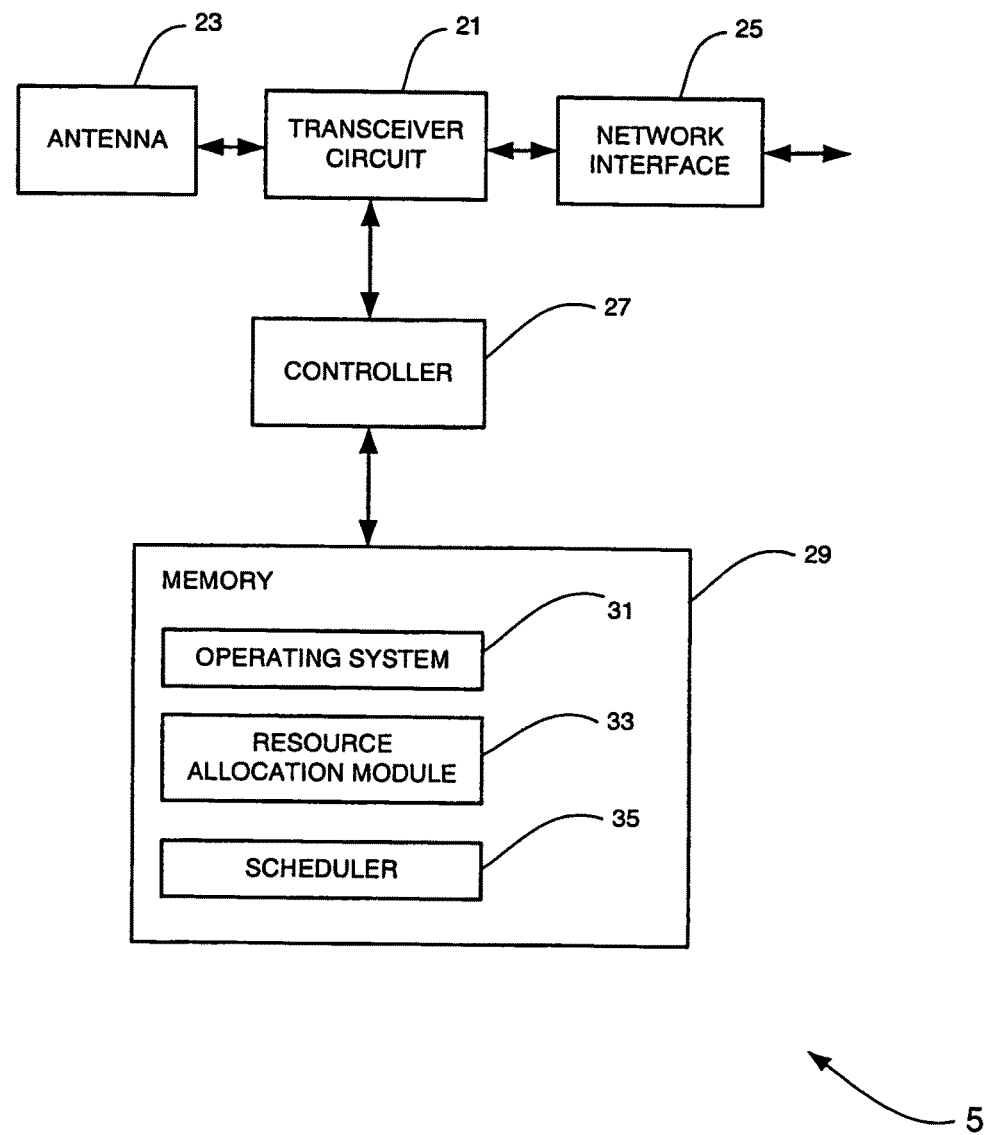
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. A controller 27 controls the operation of the transceiver circuit 21 in accordance with software stored in memory 29. The software includes, among other things, an operating system 31, a resource allocation module 33 and a scheduler 35. The resource allocation module 33 is operable to allocate the above described communications resources for the uplink and downlink communications to each mobile telephone 3 and the scheduler 35 schedules the transmission of downlink data to each mobile telephone 3 and the uplink transmission opportunities for each mobile telephone 5 based on the allocated resources. When scheduling the transmission of the downlink data and the transmission opportunities for a mobile telephone 3, the scheduler 35 does so in accordance with a DRX/DTX pattern or schedule for the mobile telephone 3, which is also signalled to or known by the mobile telephone 3. If the DRX/DTX pattern does not cover sufficient resources for the amount of non-real time data to be communicated, then the base station can signal the mobile telephone 3 to change its DRX/8DTX pattern.

As those skilled in the art will appreciate, different DRX and DTX schedules may be defined for each mobile telephone 3, however, in the following description it will be assumed that a common DRX/DTX pattern is defined for each mobile telephone 3. This common DRX/DTX pattern will define the "on-duration" of the DRX/DTX periods and their repetition frequency (DRX/DTX-cycle) for the mobile telephone 3.

Mobile Telephone

Figure 3:
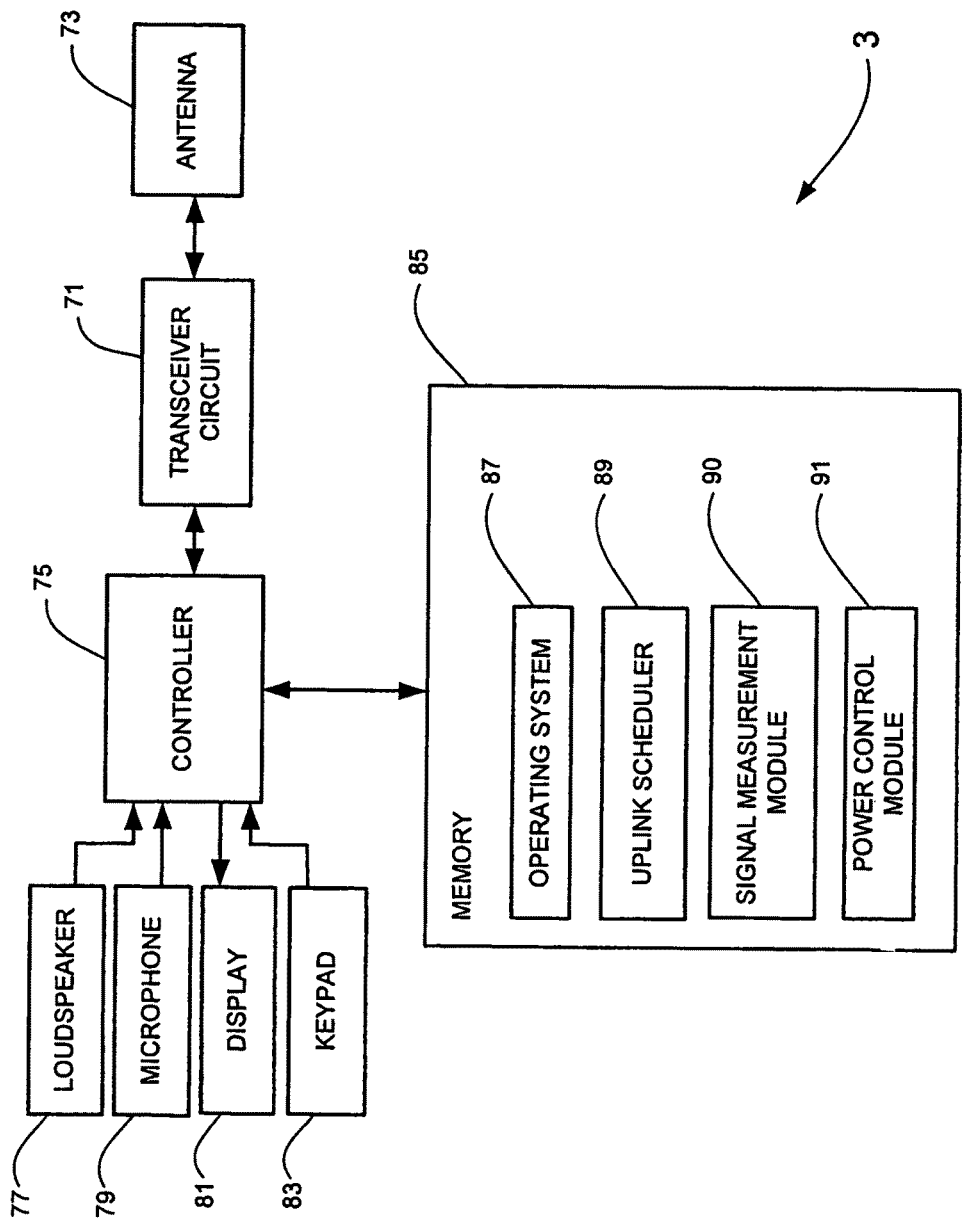
FIG. 3 schematically illustrates a mobile communication device forming part of the system shown in FIG. 1.

FIG. 3 is a block diagram illustrating the main components of each of the mobile telephones 3 shown in FIG. 1. As shown, the mobile telephones 3 include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87, an uplink scheduler 89, a signal measurement module 90 and a power control module 91. The uplink scheduler 89 is responsible for scheduling the transmission of uplink data in accordance with the resources allocated to the mobile telephone 3 for its uplink transmissions by the base station 5; the signal measurement module 90 is responsible for making inter-frequency and inter-RAT signal measurements for the base station 5; and the power control module is responsible for powering down the transceiver circuit 71 during the DRX/DTX off periods.

In the above description, the base station 5 and the mobile telephones 3 are described for ease of understanding as having a number of discrete modules (such as the resource allocation, scheduler, power control and signal measurement modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Protocols

Figure 4:
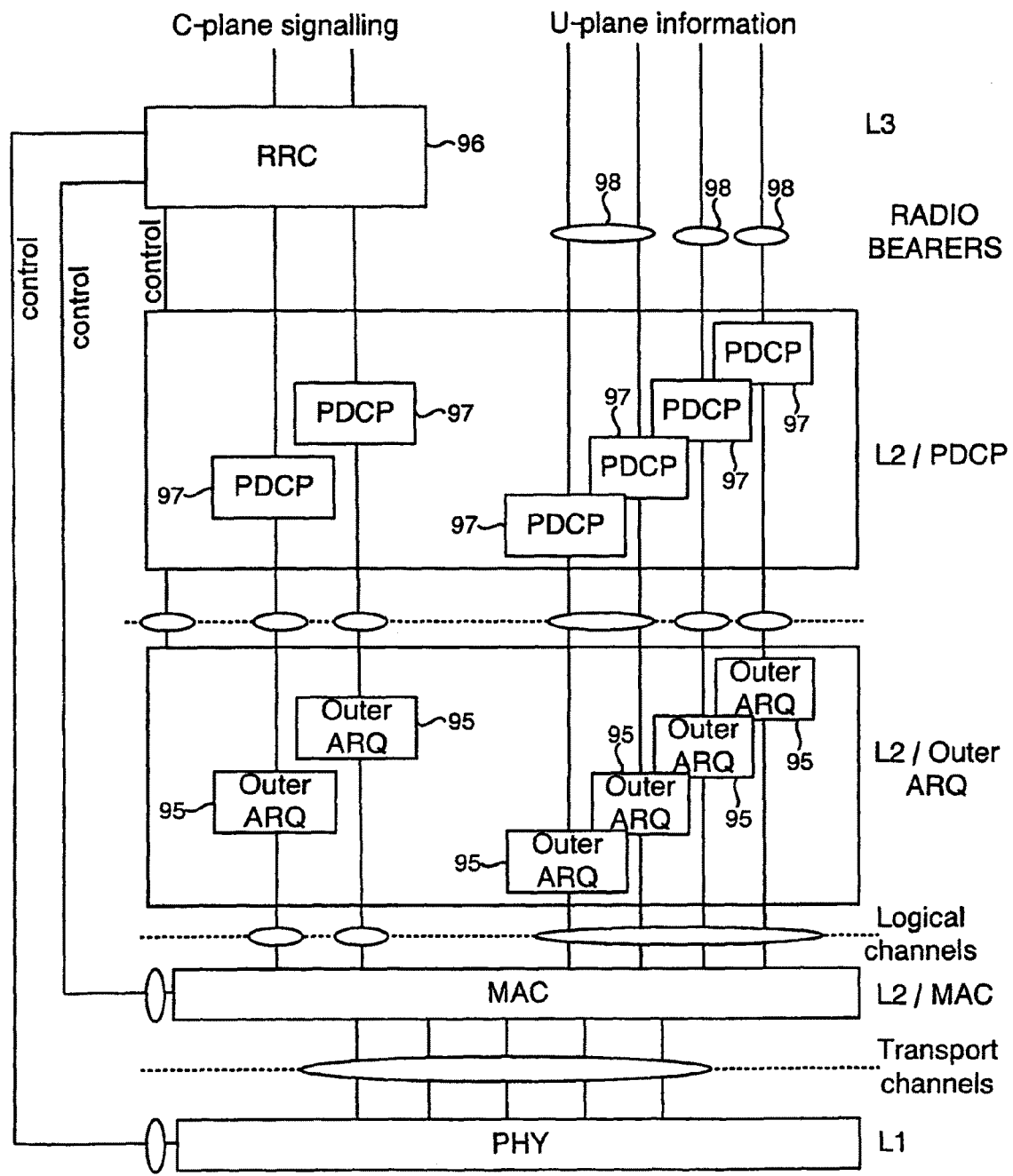
FIG. 4 illustrates three layers of a protocol stack used in the mobile communication device and the base station shown in FIG. 1.

FIG. 4 illustrates part of a protocol stack (lower three layers) used in the mobile telephones 3 and the base stations 5. The first layer is the physical layer (L1) which is responsible for the actual transmission of the data over the radio communication channel. Above that is the second layer (L2), which is divided into three sub-layers—the Medium Access Control layer (L2/MAC) which is responsible for controlling access to the air interface; the Outer ARQ layer (L2/OARQ) which is responsible for concatenation and segmentation of data packets, the acknowledgment of packets and the retransmission of data packets where necessary; and the PDCP layer (L2/PDCP) which is responsible for header compression and ciphering. Above the second layer is the Radio Resource Control (RRC) layer (L3/RRC) that is responsible for controlling radio resources used in the air interface between the base station 5 and the mobile telephone 3. As shown, the L2/Outer ARQ layer includes a number of Outer ARQ entities 95 used to manage the transmission of C-plane data and U-plane data and the L2/PDCP layer includes PDCP entities 97 used to process the C-plane and the U-plane data.

FIG. 4 also shows the radio bearers 98 assigned to each source of data to be transmitted. Several software applications may be operating at the same time and each application may be sending and/or receiving data. A respective radio bearer would be associated with each task and some radio bearers are assigned higher priority than others. For example, radio bearers assigned to real time services will be assigned higher priority than those assigned to non-real time services. The communication resources allocated by the base station 5 for the uplink are shared between the radio bearers 98, depending on their assigned priorities and data rates. The RRC layer 96 sets the data rate and priority for each radio bearer 98. The uplink scheduler 89 then controls the scheduling of the data packets of each radio bearer 98 for transmission based on the data rates and priorities assigned to the radio bearers by the RRC layer 96.

Typically, the MAC layer will control the scheduler 35 and the RRC/MAC layer will control the changing of the DRX/DTX pattern used if necessary to accommodate changes in the traffic levels for the mobile telephone 3. However, both these operations may be performed by the same layer or entity. The DRX/DTX pattern for a mobile telephone 3 may be one of a set number of possible patterns, with the base station 5 simply signalling (implicitly or explicitly) the appropriate pattern to use at any given time. Alternatively, the base station 5 may dynamically change the on duration and/or the DRX interval depending on the current amount of traffic to be communicated.

DRX/DTX for Real Time Services

In general, it is agreed in RAN2 that the resource allocation for RT services will be done through "persistent scheduling" where the resources for first transmissions of RT packets is pre-assigned and where retransmissions are explicitly scheduled with L1/L2 control signalling. It is also commonly understood in RAN2 that whenever the UE is allocated uplink or downlink (UL/DL) pre-defined resources; it will check L1/L2 control signalling for both directions to see if any new allocations are indicated.

For example, for VoIP services, the persistently allocated resources during a talk spurt period shall be allocated 20 ms apart by the base station scheduler 35. This is illustrated in FIG. 5, which shows persistently scheduled resources 101$t$ being provided 20 ms apart. Hence the scheduler 35 configures the DRX interval for this VoIP service to be 20 ms. In this case, the mobile telephone 3 "wakes up" its transceiver circuit to send/receive a VoIP packet during the "On Duration" 103 and any possible retransmissions and then powers down the transceiver circuit until the next "On Duration". Any control signalling is also transmitted during this "On Duration". This ensures that RRC/MAC signalling will not be delayed beyond 20 ms.

DRX/DTX for Mixed (RT+NRT) Services

With a RT service like VoIP having persistently allocated resources for first transmissions, the mobile telephone 3 has to wake up to transmit/receive pre-assigned resources for the first transmissions at fixed intervals. If a NRT service is also to be scheduled along with VoIP for a mobile telephone 3, then there are two possible options for configuring the DRX/DTX pattern:

1. NRT packets are scheduled in multiple spurts between two VoIP packets. This option is illustrated in FIG. 6a, which shows two NRT packets 105-1 and 105-2 between adjacent VoIP packets 101$t$ and 101$t$+1; 101$t$+3 and 101$t$+4 and the like.

2. NRT packets are scheduled immediately after the VoIP packets. This option is illustrated in FIG. 6b, which shows the NRT packets 105t, 105t+1, immediately after the VoIP packets 101t.

With the first option, the mobile telephone 3 will have to wake up during multiple short time intervals between the two VoIP packets 101 to receive/transmit the NRT packets 105. The inventor believes that this will have adverse affects on the mobile telephone's battery life. Furthermore if the mobile telephone 3 is receiving/transmitting during multiple short intervals, the gap duration 107 (FIG. 6a) of the DRX/DTX pattern may not be sufficiently long for the mobile telephone 3 to perform the inter frequency/RAT measurements. In such cases the base station 5 may have to reconfigure the DRX/DTX pattern to create gaps to allow inter-frequency/RAT measurements to be performed by the mobile telephone 3 and this would require additional signalling.

With the second option, the NRT packets 105 are transmitted/received immediately after the VoIP packet 101 hence the mobile telephone 3 does not have to wake up for multiple short intervals in between the two VoIP packets 101. The inventor believes that this is a better approach for the mobile telephone's battery life as the mobile telephone 3 will wake up each time for a longer duration 103 (FIG. 6b) in which it is scheduled rather than multiple short durations between two VoIP packets 101.

Further, with the second option, the mobile telephone 3 should already have enough gaps if the activity level of NRT Traffic is not very high. In this case the signalling procedures to start/stop inter-frequency/RAT measurements may not be needed at all. The mobile telephone 3 can start/stop inter-frequency/RAT measurements autonomously using the already allocated gaps of the DRX/DTX pattern, upon occurrence of a certain event. The criteria for such events can be specified by the base station's RRC layer, and in that sense, the measurements are still network controlled. Note that such events need not trigger any measurement reports.

Hence the inventor feels that the second option is more suited to address the issue of gap control and DRX/DTX control together. Therefore, the following section will focus on this second option.

Response to Increased NRT Activity

If the amount of NRT data increases, the "On Duration" 103 within the DRX/DTX interval will also increase. Hence it is proposed that the starting time for the "On Duration" is fixed while the "On Duration" 103 is configured as a function of the traffic activity level as illustrated in FIGS. 7a and 7b for low activity NRT traffic and high activity NRT traffic, respectively. Therefore, with option 2, there is the advantage that the natural gaps 107 for performing inter frequency/RAT measurements are still available unless the UE goes into continuous reception/transmission mode.

Switching Between Talk Spurt and Silent Periods

When VoIP traffic switches from a talk spurt period to a silent period, the resources are provided every 160 ms for transmission of a Silence Insertion Description (SID) packet. Therefore, various options are possible for DRX configuration during VoIP silence periods. Some of these options are listed below:

Alternative 1: the DRX/DTX interval is extended to the duration of the silent period (i.e. 160 ms) and with increased "On duration" to provide the same overall TX/RX opportunities. This alternative is illustrated in FIG. 8b, where each DRX "On duration" 103 starts with a VoIP SID packet 109t followed by NRT packets 105t.

Alternative 2: the DRX interval is left unchanged, with the same "On duration" and starting time as compared to the talk spurt period and assuming the NRT traffic activity remains unchanged at the time of switch (between talk spurt and silence). This alternative is illustrated in FIG. 8c, which shows the VoIP SID packets 109t being transmitted at the same timings as in FIG. 8b, but with the NRT packets 105t being transmitted in the same "On durations" 103 as in the long talk spurt period illustrated in FIG. 8a. As shown, in this case, for the on durations 103 that do not have a VoIP SID packet, the mobile telephone 3 remains on in the interval 110t without sending/receiving a packet.

Alternative 3: Two "On Durations" are configured. The first one to transmit/receive a VoIP SID packet and NRT packets and the other one only for NRT packets. This alternative is illustrated in FIG. 8d, which shows the two "On Durations" 103-1 and 103-2. As can be seen, this is similar to the alternative shown in FIG. 8c, except there are no intervals 110t where the mobile telephone remains on without sending/receiving packets. As the positions of the NRT packets 105 to be transmitted remain unchanged, two DRX intervals 103-1 and 103-2 are needed. This case can be thought to be similar to the case where the mobile telephone 3 is given a separate DRX/DTX pattern for NRT and VoIP services and the mobile telephone 3 performs a Boolean "OR" operation on the two DRX/DTX patterns.

The problem with Alternative 1 is that the transmission of NRT traffic 105 and signalling would be delayed by 160 ms which is not acceptable and hence cannot be considered for DRX/DTX configuration.

Alternative 2 has the advantage that the DRX/DTX pattern need not be reconfigured while switching between talk spurt and silent periods of VoIP. If there are no NRT packets 105 or signalling or VoIP packets 101 available in both UL and DL directions, the mobile telephone may remain "On" for a subframe or two without any transmission and reception, although this will not happen frequently. Moreover, when switching back to talk spurt period no reconfiguration is needed.

Alternative 3 could be a bit complicated considering that two DRX intervals and On Durations 103 are needed to be configured (signalled to the mobile telephone 3) when switching from talk spurt to silent duration.

In view of these issues, the inventor prefers Alternative 2.

Modifications and Alternatives

A number of modifications and alternatives will now be described. In the above embodiment, a common DRX/DTX pattern was defined for each mobile telephone 3. As those skilled in the art will appreciate, separate DTX and DRX patterns may be defined and signalled to each mobile telephone 3. The mobile telephone 3 may then combine the two patterns, for example by performing a Boolean "OR" operation, to identify the periods in which it can power down its transceiver circuitry.

In the previous embodiment, no interactions between the HARQ and DRX were considered and it was assumed that the HARQ process is finished before the end of the "On-duration". However, if the HARQ process is not finished before the end of "On-duration", in order to avoid any delay of delivery of DL data packets, the mobile telephone 3 and the base station 5 can be configured with minimum and the maximum values of "On-duration" and these can be extended in steps starting from the minimum value. Therefore, in light of the interactions between DRX and DL HARQ processes the "On Duration" described in the previous sections can be referred to as the minimum "On Duration" and could be extended in steps to allow DL HARQ termination.

As those skilled in the art will appreciate, the operations of the base station 5 and of the mobile telephones 3 may be controlled by dedicated hardware circuits or by programmable controllers controlled by software. The software may be provided at the time of manufacture or subsequently installed after downloading the software from a remote site.

Various other modifications will be apparent to those skilled in the art and will not be described in further detail here.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Scope

In RRC_CONNECTED state, a UE that is having both NRT and RT services on going, needs to be configured with appropriate DRX pattern to have maximum UE power saving and sufficient scheduling gaps made available by the serving eNB, so that the UE can perform measurements and assist the network in making inter-F/R handovers. This document discusses DRX in RRC_CONNECTED for mixed traffic in conjunction with measurement gap control and proposes some basic principles.

Discussion

Current Status

Figure 9:
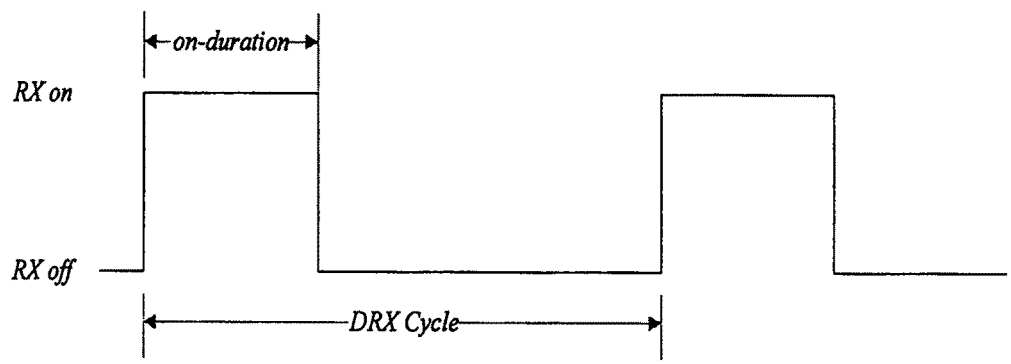
FIG. 9 illustrates an NRT-DRX handling agreed in the RAN2#58.

During RAN2#58 some agreements were made on DRX handling of NRT services. The agreements so far do not consider handling of RT services like VoIP and mixed traffic scenario cases. The NRT-DRX handling agreed in the RAN 2#58 can be characterised by FIG. 9:

on duration
UE shall monitor L1/L2 control channel for possible allocations.
off duration
UE is not required to monitor L1/L2 control channel
UE can turn off its receiver circuit
UE can perform inter-frequency/inter-RAT measurement, if needed.
DRX cycle length
The distance between two consecutive Rx on period starting positions DRX for RT and Mixed Services RT Services In general, it is agreed that the resource allocation for the RT services will be done through the "persistent scheduling" where the resources for the first transmissions will be preassigned with retransmissions always being explicitly scheduled with L1/L2 control signalling. It is commonly understood in RAN2 that whenever the UE is allocated UL/DL pre-defined resources, it will check L1/L2 control signalling for both directions to see if any new allocations are indicated.

Figure 10:
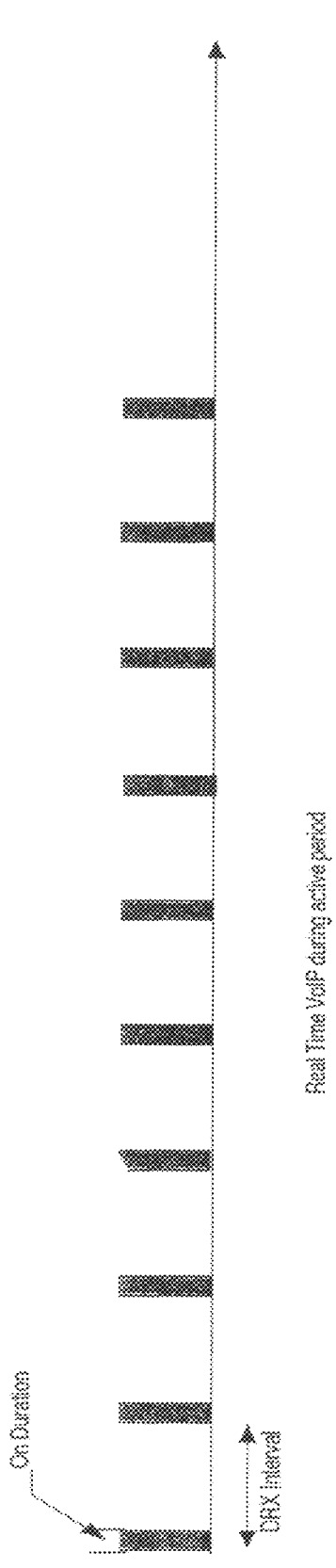
FIG. 10 illustrates a relationship between on duration and DRX interval for the real time VoIP services.

For example, for the VoIP services, the persistently allocated resources during the talk spurt period shall be allocated 20 ms apart by the eNB scheduler as shown in FIG. 10. Hence the DRX interval can be configured to be 20 ms for VoIP service, UE shall wake up to send/receive the VoIP packet during the "On Duration" and any possible retransmissions and go back to sleep till the next "On Duration". Any control signalling shall also be transmitted during this "On Duration". This shall ensure that RRC/MAC signalling will not be delayed beyond 20 ms.

Mixed (RT+NRT) Services

Figure 11:
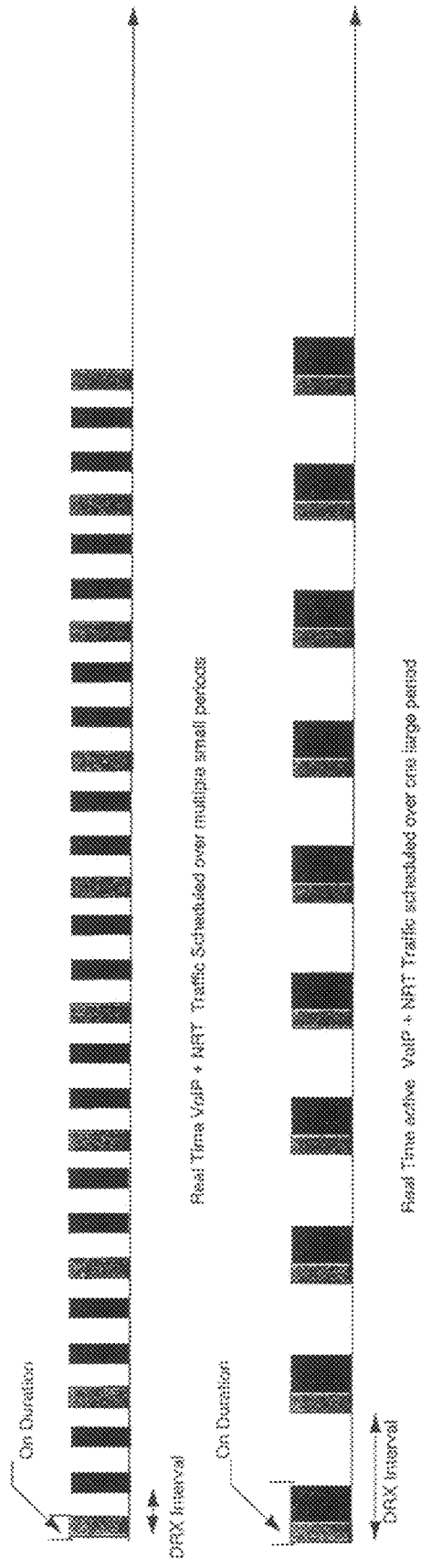
FIG. 11 illustrates two possible options for configuring DRX mechanism when an NRT service is scheduled.

With RT Service like VoIP having persistently allocated resources for the first transmission, UE will have to wake up to transmit/receive pre-assigned resources for the first transmissions at fixed intervals. If the NRT service is also to be scheduled along with VoIP for a UE, there are two possible options for configuring DRX mechanism, as shown in FIG. 11.

1. NRT packets are scheduled in multiple spurts between two VoIP packets.
2. NRT packets are scheduled immediately after the VoIP packets Note: The Y axis does not represent the data in the buffers In the first option, the UE will have to wake up during multiple short time intervals between the two VoIP packets to receive NRT packets. This we feel shall have adverse effect on UE battery life. Furthermore if UE is receiving/transmitting during multiple short intervals, the gap duration of DRX may not be sufficiently long for the UE to perform inter frequency/RAT measurements. In such cases the eNB may have to reconfigure DRX pattern to create gaps in case inter-F/R measurements have to be performed by the UE. This would require additional signalling.

In the second option, the NRT packets are transmitted immediately after the VoIP packet hence the UE does not have to wake up for multiple short intervals in between the two VoIP packets. We feel it is better for the UE battery life if UE wakes up for a longer duration in which it is scheduled rather than multiple short durations between two VoIP frames.

Further with the second option, the UE should already have enough gaps if the activity level of NRT Traffic is not very high. In such case the signalling procedures to start/stop inter-F/R measurements may not be needed at all. The UE can start/stop inter-F/R measurements autonomously using the already allocated gaps of DRX, upon occurrence of a certain event. The criteria for such events shall be specified by eNB RRC, and in that sense, the measurements are still network controlled. Note that such events shall not trigger any measurement reports.

Hence we feel that the second option is more suited to address the issue of gap control and DRX control mechanism together. We therefore in following section focus on the second option.

Response to Increased NRT Activity

Figure 12:
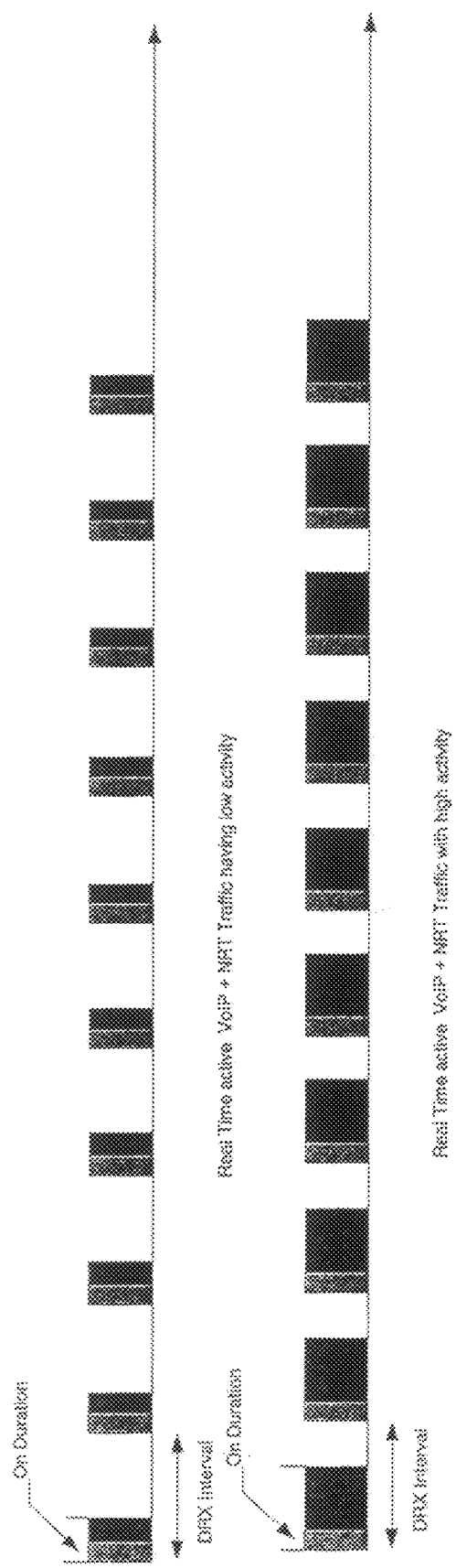
FIG. 12 illustrates two possible options for increasing NRT data.

In case the NRT data increase, the "On Duration" within the DRX interval is increased. Hence we propose that the starting time for the "On Duration" is fixed while the "On Duration" is configured as a function of the traffic activity level as shown in FIG. 12.

With option 2, a big advantage is that the natural gaps for performing inter frequency/RAT measurements are still available unless the UE goes into continuous reception/transmission mode.

Switching Between Talkspurt and Silent Periods

Figure 13:
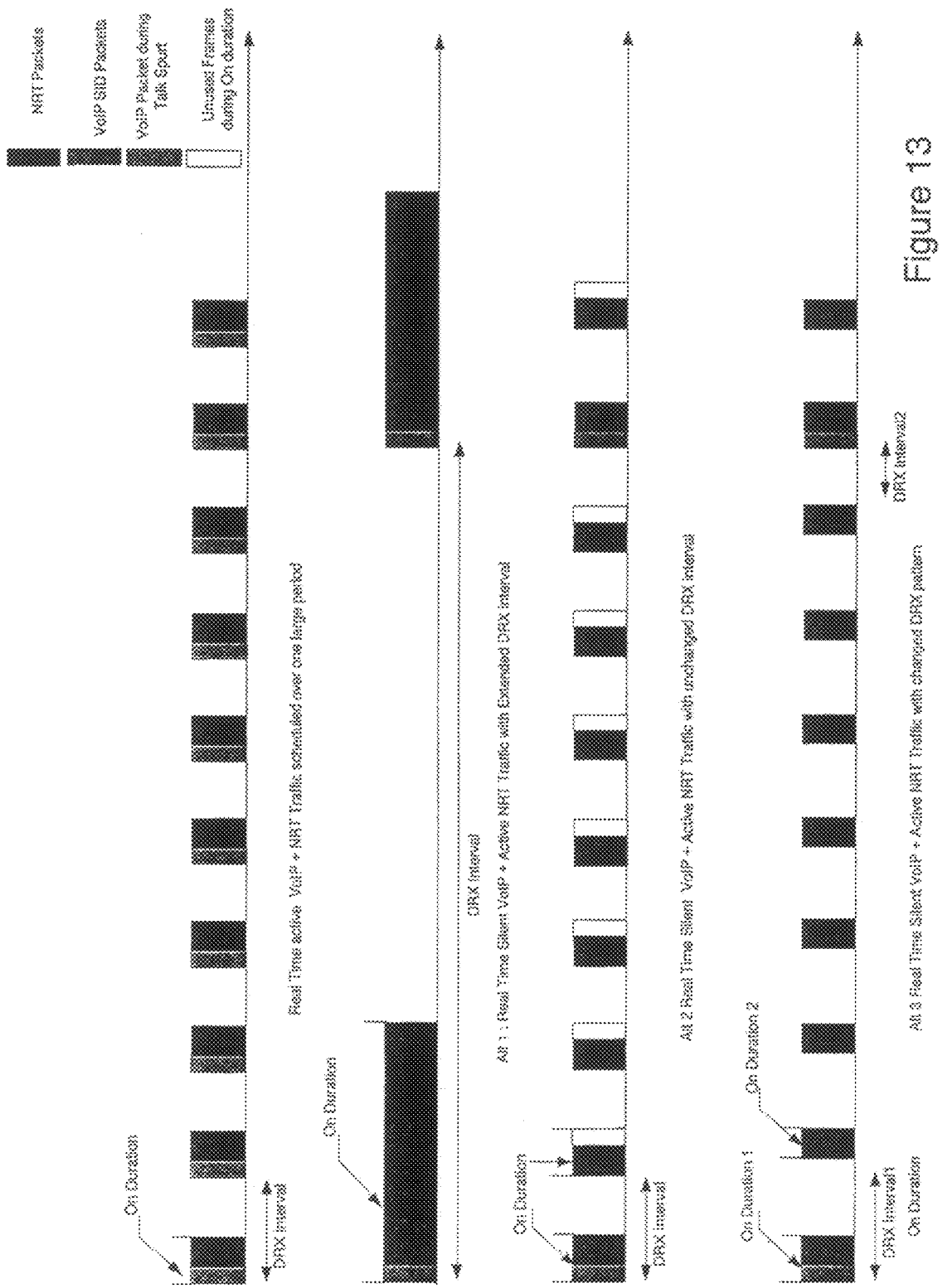
FIG. 13 illustrates various options for DRX configuration when the VoIP traffic switches from talk spurt period to silent period.

When the VoIP traffic switches from talk spurt period to silent period, various options for DRX configuration are possible. Some of these options are listed below and are shown in FIG. 13.

Alternative 1: DRX interval is extended to the duration of Silent Bursts (i.e 160 ms) and with increased "On duration".
Alternative 2: There is no change in the DRX interval, "On duration and starting time as compared to the talk spurt period assuming the NRT traffic activity remains unchanged at the time of switch.
Alternative 3: Two "On Durations" are configured. First one is to transmit/receive VoIP Silent Frame and NRT packets and other only for NRT packets. The positions of the NRT packets to be transmitted remains unchanged hence two DRX intervals are needed. Alternatively this case can be thought to be similar to the case where UE is given a separate pattern for NRT and VoIP services and UE does an OR operation on these patterns.

Problem with Alternative 1 is that the transmission of NRT traffic/signalling would be delayed by 160 ms which is not acceptable and hence cannot be considered for DRX configuration.

Alternative 2 has an advantage that the DRX need not be reconfigured while switching between talkspurt and silent periods of VoIP. If there are no NRT packets or signalling or VoIP packets available in both UL/DL directions, the UE may remain On a subframe or two without any transmission and reception although this will not happen frequently. Moreover, when switching back to talk spurt period no reconfiguration is needed.

Alternative 3 could be bit complicated considering the fact that two DRX intervals and On Durations are needed to be configured when switching from talk spurt to silent duration.

Considering these facts we propose that Alternative 2 is adopted for the silent period as well.

Interaction Between DRX and DL HARQ

Although it has been decided that the HARQ operation related to UL data transmission is independent of DRX operation. However the interaction of HARQ operation of DL data and DRX operation is still FFS.

In the previous sections there were no interactions between the HARQ and DRX were considered and it was assumed that the HARQ process is finished before the end of "On-duration". However, if the HARQ process is not finished before the end of "On-duration", in order to avoid any delay of delivery of DL data packets, UE and ENB can be configured with minimum and the maximum values of "On-duration" and these can be extended in steps starting from the minimum value [1].

In light of the interactions between DRX and DL HARQ processes the "On Duration" described in the previous sections can be referred as the minimum "On Duration" and could be extended in steps to allow DL HARQ termination.

This application is based upon and claims the benefit of priority from United Kingdom patent application No. 0714448.8, filed on Jul. 24, 2007, the disclosure of which is incorporated herein in its entirety by reference.

The invention claimed is:

1. A method performed by a mobile communication device of a communication network, the method comprising:
    receiving allocation data defining an allocation of resources to allow the mobile communication device to communicate data with the communication network, the allocation data defining the allocation of resources for both a real time service and a non real time service;
    storing a discontinuous reception/transmission (DRX/DTX) pattern which comprises:
        i) duration data defining a duration of on periods in which the mobile communication device can communicate data with the communication network; and
        ii) interval data defining an interval between adjacent on periods;
    using the DRX/DTX pattern to control times at which the mobile communication device can power down circuitry thereof; and
    using said DRX/DTX pattern and the allocated resources to control the communication of data with the communication network, such that:
        i) non real time data and real time data are communicated in different on periods, with the non-real time data being communicated within one or more on periods between two on periods in which real time data is communicated; or
        ii) non real time data is communicated in a same on period as real time data.

2. A method according to claim 1, wherein said DRX/DTX pattern and the allocated resources are used to control the communication of data with the communication network, such that non real time data is communicated in the same on period as real time data.

3. A method according to claim 2, wherein said DRX/DTX pattern and the allocated resources are used to control the communication of data with the communication network, such that non real time data is communicated in the same on period as real time data and after said real time data.

4. A method according to claim 1, wherein said DRX/DTX pattern and the allocated resources are used to control the communication of data with the communication network, such that each on period includes non real time data and real time data.

5. A method according to claim 1, further comprising receiving data from the communication network signalling a change in the duration of said on periods, to accommodate a change in the amount of traffic to be communicated between the network and the mobile communication device.

6. A method according to claim 1, further comprising receiving data from the communication network signalling a change in the interval between said on periods, to accommodate a change in the amount of traffic to be communicated between the network and the mobile communication device.

7. A method according to claim 1, wherein said resource data defines periodic communication opportunities for real time data.

8. A method according to claim 7, wherein the real time data service includes an active period and a silence period, and
    wherein the frequency of said periodic communication opportunities for said real time data is greater during said active period than during said silence period.

9. A method according to claim 8, wherein the DRX/DTX pattern is independent of whether the real time data service is in said active period or said silence period.

10. A method according to claim 8, wherein said DRX/DTX pattern and the allocated resources are used to control the communication of data with the communication network, such that during said silence period one or more of the on periods includes non real time data but no real time data.

11. A method according to claim 10, wherein said DRX/DTX pattern and the allocated resources are used to control the communication of data with the communication network, such that during said silence period, the mobile communication device does not communicate data with the communication network for at least one frame of said one or more of the on periods.

12. A method according to claim 1, further comprising making one or more signal measurements of signals from the communications network during gaps between said on periods.

13. A method according to claim 12, wherein said signal measurements include inter frequency and/or inter RAT measurements.

14. A method according to claim 1, wherein said interval data defines the interval between the start of adjacent on periods.

15. A computer implementable instructions product or a computer readable recording medium comprising computer implementable instructions for causing a programmable computer device to carry out the method of claim 1.

16. A method according to claim 1, wherein said resource allocation data defines periodic communication opportunities for real time data and further comprising transmitting control signalling during an on period in which said real time data is scheduled for transmission.

17. A method performed by a node of a communication network, the method comprising:
storing a discontinuous reception/transmission (DRX/DTX) pattern for a mobile communication device, the DRX/DTX pattern comprising:
i) duration data defining a duration of on periods in which the mobile communication device can communicate data with the node; and
ii) interval data defining an interval between adjacent on periods;
generating allocation data for the mobile communication device in accordance with a requested real time service and a requested non real time service and in accordance with the stored DRX/DTX pattern, the allocation data defining an allocation of resources for both the real time service and the non real time service to allow the mobile communication device to communicate data with the node; and
sending the allocation data to the mobile communication device for use with the DRX/DTX pattern to control the communication of data between the mobile communication device and the node, such that:
i) non real time data and real time data are communicated in different on periods, with the non-real time data being communicated within one or more on periods between two on periods in which real time data is communicated; or
ii) non real time data is communicated in a same on period as real time data.

18. A method according to claim 17, wherein said generating generates the allocation data to control the communication of data with the mobile communication device, such that the non real time data is communicated in the same on period as real time data.

19. A method according to claim 18, wherein said allocated resources are used to control the communication of data with the mobile communication device, such that the non real time data is communicated in the same on period as real time data and after said real time data.

20. A method according to claim 18, wherein said allocated resources are used to control the communication of data with the communication network, such that each on period includes non real time data and real time data.

21. A method according to claim 17, further comprising signalling to the mobile communication device a change in the duration of said on periods of the DRX/DTX pattern, to accommodate a change in the amount of traffic to be communicated between the node and the mobile communication device.

22. A method according to claim 17, further comprising signalling to the mobile communication device a change in the interval between said on periods of the DRX/DTX pattern, to accommodate a change in the amount of traffic to be communicated between the node and the mobile communication device.

23. A method according to claim 17, wherein said generating generates resource data that defines periodic communication opportunities for real time data.

24. A method according to claim 23, wherein the real time data service includes an active period and a silence period, and
wherein the generating generates resource data such that the frequency of said periodic communication opportunities for said real time data is greater during said active period than during said silence period.

25. A method according to claim 24, wherein the DRX/DTX pattern for the mobile communication device is independent of whether the real time data service is in said active period or said silence period.

26. A method according to claim 24, wherein said allocated resources are used to control the communication of data between the node and the mobile communication device, such that during said silence period one or more of the on periods includes non real time data but no real time data.

27. A method according to claim 26, wherein said allocated resources are used to control the communication of data between the communication network and the mobile communication device, such that during said silence period, the mobile communication device does not communicate data with the communication network for at least one frame of said one or more of the on periods.

28. A mobile communication device comprising:
a receiver for receiving allocation data defining an allocation of resources to allow the mobile communication device to communicate data with the communication network, the allocation data defining an allocation of resources for both a real time service and a non real time service;
a memory for storing a discontinuous reception/transmission (DRX/DTX) pattern which comprises:
i) duration data defining a duration of on periods in which the mobile communication device can communicate data with the communication network; and
ii) interval data defining an interval between adjacent on periods;
a controller for using the DRX/DTX pattern to control times at which the mobile communication device can power down circuitry thereof; and
a circuit for using said DRX/DTX pattern and the allocated resources to control the communication of data with the communication network, such that:
i) non real time data and real time data are communicated in different on periods, with the non-real time data being communicated within one or more on periods between two on periods in which real time data is communicated; or
ii) non real time data is communicated in a same on period as real time data.

29. A communication node comprising:
a memory for storing a discontinuous reception/transmission (DRX/DTX) pattern for a mobile communication device, the DRX/DTX pattern comprising:
i) duration data defining a duration of on periods in which the mobile communication device can communicate data with the communication node; and
ii) interval data defining an interval between adjacent on periods;
a generator for generating allocation data for the mobile communication device in accordance with a requested real time service and a requested non real time service and in accordance with the stored DRX/DTX pattern, the allocation data defining an allocation of resources for both the real time service and the non real time service to allow the mobile communication device to communicate data with the communication node; and a transmitter for sending the allocation data to the mobile communication device for use with the DRX/DTX pattern to control the communication of data between the mobile communication device and the communication node, such that:
   i) non real time data and real time data are communicated in different on periods, with the non-real time data being communicated within one or more on periods between two on periods in which real time data is communicated; or
   ii) non real time data is communicated in a same on period as real time data.

30. A method performed by a mobile communication device of a communication network, the method comprising:
   receiving allocation data defining an allocation of resources to allow the mobile communication device to communicate data with the communication network;
   storing a discontinuous reception/transmission (DRX/DTX) pattern which comprises:
     i) duration data defining a duration of on periods in which the mobile communication device can communicate with the network; and
     ii) interval data defining an interval between adjacent on periods;
   using the stored DRX/DTX pattern to control times at which the mobile communication device can power down circuitry thereof,
   wherein the data communicated between the mobile communication device and the network comprises data for a real time service and data for a non real time service,
   wherein the real time service includes different modes in which the resources allocated to the mobile communication device are changed, and
   wherein the DRX/DTX pattern used by the mobile communication device is independent of the data rate used for the real time data service.

31. A method performed by a mobile communication device of a communication network, the method comprising:
   receiving allocation data defining an allocation of resources to allow the mobile communication device to communicate with the network;
   storing a discontinuous reception/transmission (DRX/DTX) pattern which comprises:
     i) duration data defining a duration of on periods in which the mobile communication device can communicate with the network; and
     ii) interval data defining an interval between adjacent on periods;
   using the stored DRX/DTX pattern to control times at which the mobile communication device can power down circuitry thereof,
   wherein the data transmitted and/or received by the mobile communication device comprises data for a real time service and data for a non real time service,
   wherein the real time service includes different modes in which the resources allocated to the mobile communication device are changed, and
   wherein the DRX/DTX pattern used by the mobile communication device is not changed during a changeover between the different modes of the real time service.

\* \* \* \* \*